Oct. 9, 1951     A. G. RINEHART     2,570,378
ORNAMENT FOR SLIDE FASTENERS
Filed Oct. 30, 1948     2 Sheets-Sheet 1
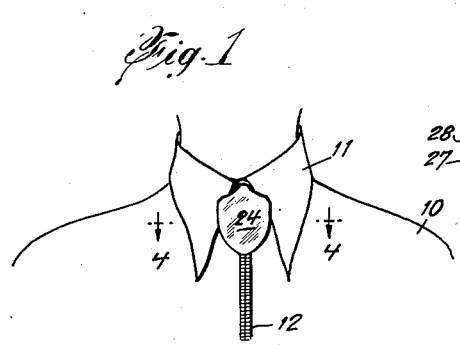
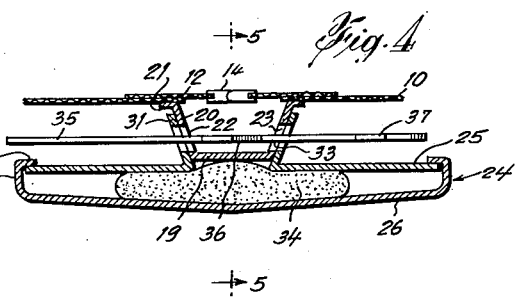
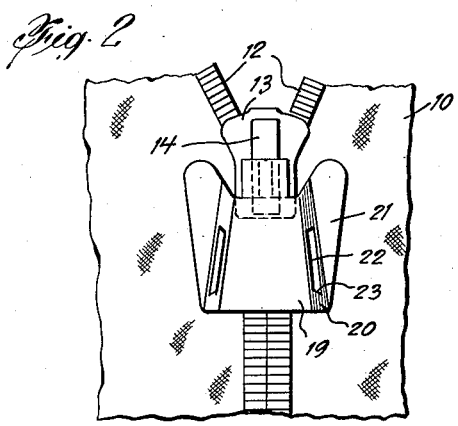
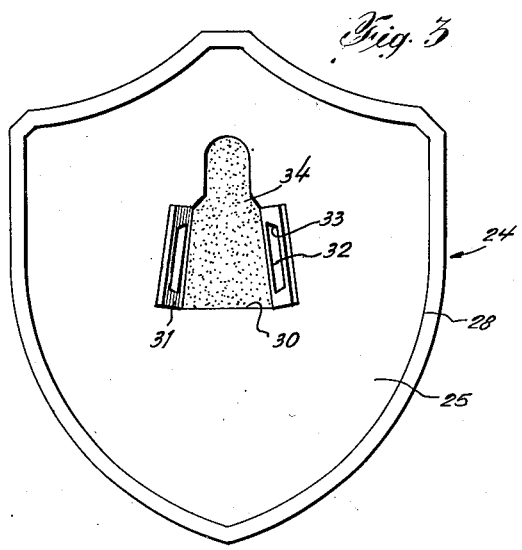
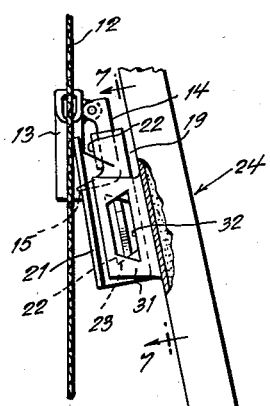
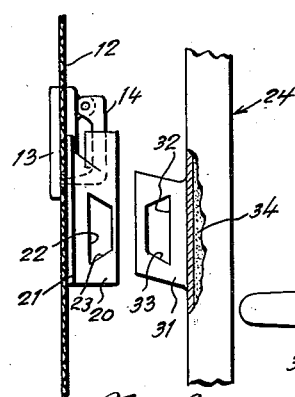
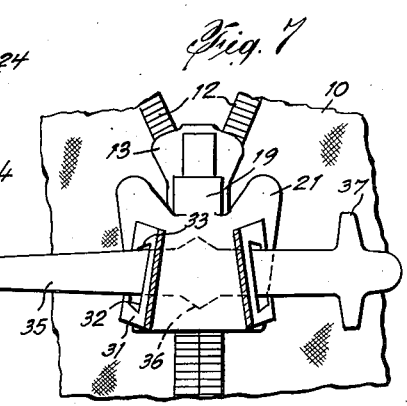
INVENTOR.
ALAN G. RINEHART
BY John P. Chandler
his ATTORNEY

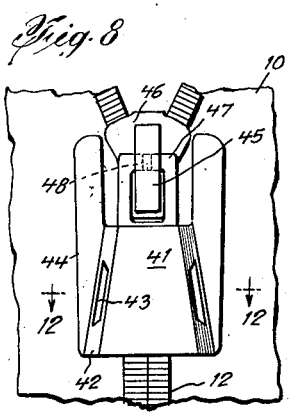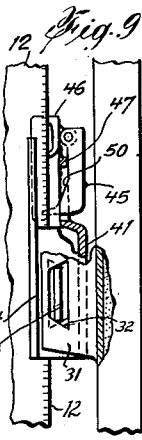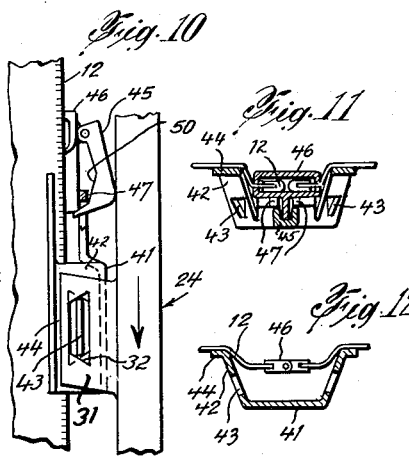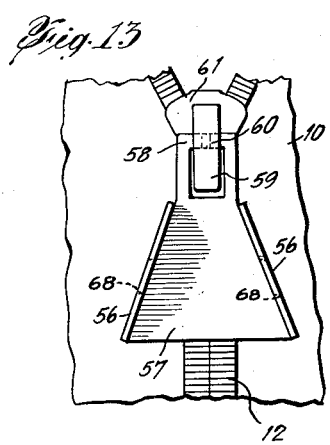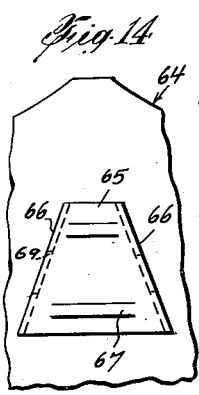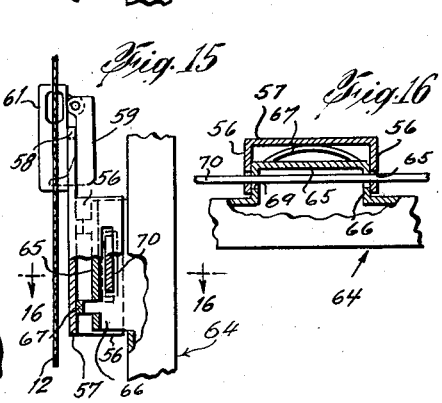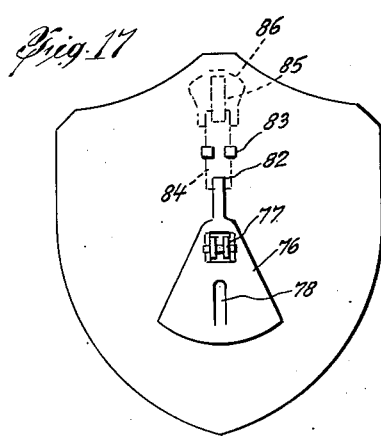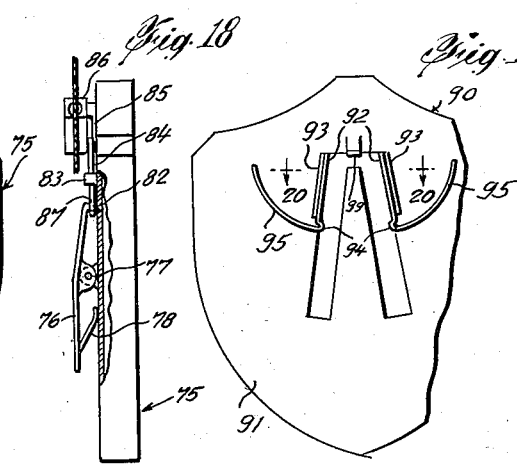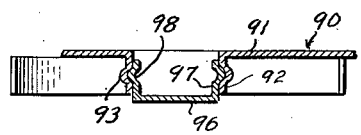

Patented Oct. 9, 1951

2,570,378

UNITED STATES PATENT OFFICE 2,570,378

ORNAMENT FOR SLIDE FASTENERS

Alan G. Rinehart, New York, N. Y.

Application October 30, 1948, Serial No. 57,530

2 Claims. (Cl. 41—34)

This invention relates to improvements in slide fasteners and relates more particularly to novel ornamental means detachably carried by the slide of the fastener which will greatly improve the appearance of the garment upon which it is carried.

The improvement constituting the present invention has particular application to men's sport shirts, many of which have a slide fastener closure extending down the front. When such a shirt is worn during informal periods or during sporting activities, it is customary to leave the shirt open at the top. When the situation becomes somewhat less informal, and opportunity is lacking for a change of shirt, it is impossible to improve the appearance of the sport shirt and get away from the characteristic "undress" which it affords. If the opening is closed up to the top and no tie is worn the effect is decidedly bad since it is obvious that something is missing. Such shirts, however, have collars which are not in general styled for ties and a tie is highly uncomfortable considering the combined layers of fabric in the neck band, the collar and the tie itself.

An important object of the present invention is to provide a slide cover for fasteners which may be formed in some ornamental shape such as a shield and which is detachably carried by the slide. The shield is so constructed as to be capable of receiving a fabric cover to improve its appearance although an ornamental metal surface would be equally acceptable.

When the shield of the present invention is applied to sport shirts the slide is preferably of the type which is self-locking, the lock being released by a pull tab. In one form of the invention this pull tab is replaced by a tab of special construction having means for supporting the shield. One convenient arrangement is to provide aligned openings on the front of the tab and the back of the shield to receive a pin or "sword."

The shield of the present invention is in no sense an imitation of a necktie since it is worn in connection with shirts which do not have neckbands and which are in general clearly unsuited to the use of neckties. Moreover, it may be worn when the shirt is open for a distance downwardly from the top and thus give an appearance quite different from that of a necktie.

A further object of the invention is to provide means for concealing the unattractive closure at the neck of a sport shirt when it is not desired to leave the shirt partially open down the front.

Yet another object of the invention is to permit the creation of a new style of semi-dress in sport shirts. The shield of the present invention will have many uses on garments other than sport shirts which are arranged to be closed with slide fasteners.

In the drawing:

Fig. 1 is a broken front elevation of a sport shirt equipped with an embodiment of the present invention.

Fig. 2 is a broken front elevation of the shirt with the shield removed.

Fig. 3 is a rear elevation of the shield.

Fig. 4 is a broken section taken on line 4—4 of Fig. 1.

Fig. 5 is a broken section taken on line 5—5 of Fig. 4.

Fig. 6 is similar to Fig. 5 but shows the parts in detached relation.

Fig. 7 is a broken section taken on line 7—7 of Fig. 5.

Fig. 8 is a broken front elevation similar to Fig. 2 but showing a modified arrangement of the present invention.

Fig. 9 is a broken vertical section of the structure shown in Fig. 8 and showing the shield in place.

Fig. 10 is a partial section similar to Fig. 9 but showing the relation of the parts when the slide is to be moved relative to the stringers.

Fig. 11 is a broken horizontal section taken on line 11—11 of Fig. 9.

Fig. 12 is a broken horizontal section taken on line 12—12 of Fig. 8.

Fig. 13 is a front elevation showing another modified arrangement of the present invention with the shield removed.

Fig. 14 is a broken rear elevation of the shield.

Fig. 15 is a broken vertical section through the completed structure.

Fig. 16 is a broken horizontal section taken on line 16—16 of Fig. 15.

Fig. 17 is a rear elevation of another modified form of shield.

Fig. 18 is a side elevation thereof.

Fig. 19 is a rear elevation of a further arrangement of the shield.

Fig. 20 is a broken section taken on line 20—20 of Fig. 19.

In the first form of the invention illustrated in Figs. 1 to 7 inclusive, the garment 10 is provided with a collar 11 and a central front opening which is arranged to be closed by a slide fastener comprising stringers 12 and a slide 13. The slide is preferably of the self-locking type and includes a pivoted lever 14 having spring means (not shown) which urge it in a clockwise direction when viewed as in Figs. 5 and 6, and thus causes its lower point 15 to enter one of the interstices between fastener elements on the stringer.

This lever generally carries a pull tab which has been removed and in its place there has been substituted a tab of special construction which may be formed from sheet metal and includes a central raised portion 19, rearwardly inclined side portions 20 and laterally extending wing portions 21 which lie on a plane generally parallel with the plane of the central portion. At its upper end this central portion is provided with rearwardly extending fingers which are bent together at their terminals so as to enclose the central or shank section of lever 14. The inwardly extending point 15 prevents the fingers from sliding off the lower end of the lever.

Side portions 20 are formed with aligned elongated slots 22 whose end walls are non-parallel as shown at 23 for a purpose to be described.

The ornament 24 is shaped like a shield and may comprise a back plate 25 and a front plate 26 whose marginal edges 27 are crimped around the rear edge of the back plate as shown at 28. The front plate may, if desired, be covered by fabric of suitable design.

The back plate has a central opening 30, some of the material being removed to form the opening and there is also formed rearwardly extending flanges 31 which are generally parallel with and closely fit the outer surfaces of side portions 20 of the special tabs.

Flanges 31 also have slots 32 which are generally aligned with slots 22 in such side portions. The end sections 33 of slots 32 are also non-parallel but are oppositely disposed from end sections 23 of slots 32.

A mass 34 of compressible material, such as sponge rubber, is disposed between the front and back plates, the area of the mass defined by opening 30 extending somewhat rearwardly of the back plate.

An insertable pin or "sword" 35 formed from sheet material is provided with a central widened section 36 and handle portions 37 at one end.

To mount the shield on the tab it is only necessary to align openings 32 in flanges 31 with openings 22 in side portions 20 of the tab. This movement will be resisted by resilient mass 34 engaging central portion 19 of the tab. When the members are compressed and occupy the position shown in Fig. 4 the pin or sword is inserted. The width of the pin is less than the greater length of slots 22 and 32 but greater than the shorter length thereof. Thus when the compression is released the inclined end walls of each pair of slots have a self-locking action on the edges of the pin. The widened central portion 36 of the pin also tends to reduce the likelihood of casual removal. When, however, it is desired to remove the shield, the parts are compressed, thus freeing the pin for withdrawal. The function of the wing portions 21 of the tab is to prevent sidewise rotation of the tab.

In the modified arrangement of Figs. 8 to 12 inclusive, the tab is again provided with the raised central portion 41, the rearwardly inclined side portion 42 having slots 43, and the laterally extending wing portions 44. The mode of attachment to the lever 45 carried by the slide 46 comprises inwardly bent lugs 47 which meet widway between the sides of the lever as shown at 48. Thus the tab may be raised upwardly as desired and when it is pulled downwardly the lugs acting against cam surface 50 of the lever move it outwardly as shown in Fig. 10 to free the slide for travel.

The shield 24 is similar to that shown in the first form of the invention and its mode of attachment to the tab is the same.

In the form shown in Figs. 13 to 16 the tab is similar to that shown in Fig. 8 except that it is reversed so that the side portions 56 extend outwardly and the center portion 57 overlies the stringers and the need for the lateral extensions is eliminated. The upwardly extending lugs 58 are bent inwardly under lever 29 and may substantially meet at the center shown at 60. The lever 59 is carried by slide 61 in the usual manner.

The shield 64 is provided on its rear surface with a bracket rearwardly struck-out section comprising a central portion 65 and opposed, non-parallel flanges 66. The resilient mass of Fig. 4 is eliminated and in its place the central portion of the bracket has plural, struck-out bowed portions 67. Side walls 56 and 66 have aligned slots 68 and 69 respectively, which are arranged to receive the flat pin or key 70. To assemble the parts, the shield and the tab are compressed, thus putting bowed sections 67 under compression and the pin then inserted as shown in Fig. 16.

It will be understood that the rearwardly struck-out section of the rear wall of the shield, comprising portions 65, 66 and 67, may be formed as a separate bracket which is attached to such rear wall. Also the entire member may be formed in one piece and molded from plastic material. Similarly, the tabs as well as the shields in any of the forms of the invention may be formed from plastic material as well as from sheet metal.

In the arrangement of Figs. 17 and 18 the shield 75 is provided on its rear surface with a lever 76 which is centrally pivoted at 77. The lower end is urged away from the shield by a struck-out spring 78 and the upper end is shaped to form a hook 82 which is urged against the rear wall of the shield. Such rear wall is further provided with tracks 83 which receive the lower end of the pull-tab 84 carried by the lever 85 on the slide 86. The lower end of the pull-tab has an opening 87 which receives the hook 82. Thus, in this instance, the pull-tab is similar to conventional pull-tabs except for opening 87. To attach the shield to the pull-tab, the latter is moved downwardly between tracks 83 and the lower end of lever 76 depressed. Upon release of the lever the hook enters opening 87 and the shield is locked in place.

In the final form of the invention shown in Figs. 19 and 20, the shield 90 is formed with a rear wall 91 having an inverted V-shaped struck-out portion wherein no metal need be removed, the legs of the V comprising opposed walls 92 having outwardly disposed recesses 93. At their lower ends the fingers have inwardly bent stops 94 and outwardly bent terminal sections 95.

The tab is carried by the slide in any of the ways earlier described and includes a central portion 96 and opposed side portions 97 having ridges 98 arranged to be received in recesses, the side portions 97 having the same angular relation to each other as walls 92 and being arranged to be moved upwardly into engagement therewith while stops 94 are in outward position by compressing terminal sections between the thumb and forefinger. A struck-out stop 99 limits downward movement of the shield relative to the tab. It will also be understood that the shield or ornament may be detachably reused directly to the slide instead of to the lever.

While four forms or embodiments of the invention have been shown and described herein for illustrative purposes, and the construction and arrangement incidental to specific applications thereof have been disclosed and discussed in detail, it is to be understood that the invention is limited neither to the mere details or relative arrangement of parts, nor to its specific embodiments shown herein, but that extensive deviations from the illustrated forms or embodiments of the invention may be made without departing from the principles thereof.

What I claim is:

1. A device adapted to be mounted on a slide fastener having opposed stringers, and a slide, comprising a shield of larger dimensions than the slide which is arranged to overlie the slide, a pull-tab provided with a central portion which is connected with the slide, angular flanges carried along opposed sides thereof and having aligned slots therein, the shield being provided on its rear face with spaced flanges also having aligned slots therein, and a pin arranged to pass through the several aligned slots to mount the shield on the tab.

2. A device adapted to be mounted on a slide fastener having opposed stringers, a slide and a hinged lever arranged to lock the slide relative to the stringers, comprising a shield of larger dimensions than the slide which is carried by the lever, a pull-tab provided with a central portion whose upper end is arranged for connection with the lever, rearwardly inclined angular flanges carried along opposed sides thereof and having aligned slots therein, and laterally extending wing portions carried along the rear edges of the flanges, the shield being provided on its rear face with spaced flanges also having aligned slots therein, and a flat pin arranged to pass through the several aligned slots to mount the shield on the tab.

ALAN G. RINEHART.

REFERENCES CITED

The following references are of record in the file of this patent:

UNITED STATES PATENTS

| Number | Name | Date |
| --- | --- | --- |
| 2,145,118 | Knoess | Jan. 24, 1939 |
| 2,148,757 | Kilkenny | Feb. 28, 1939 |
| 2,232,756 | Marcus | Feb. 25, 1941 |
| 2,292,484 | Schwartz | Aug. 11, 1942 |